Dec. 25, 1962
A. B. COHEN ETAL
3,070,442
PROCESS FOR PRODUCING COLORED POLYMERIC RELIEF IMAGES AND ELEMENTS THEREFOR
Filed July 18, 1958
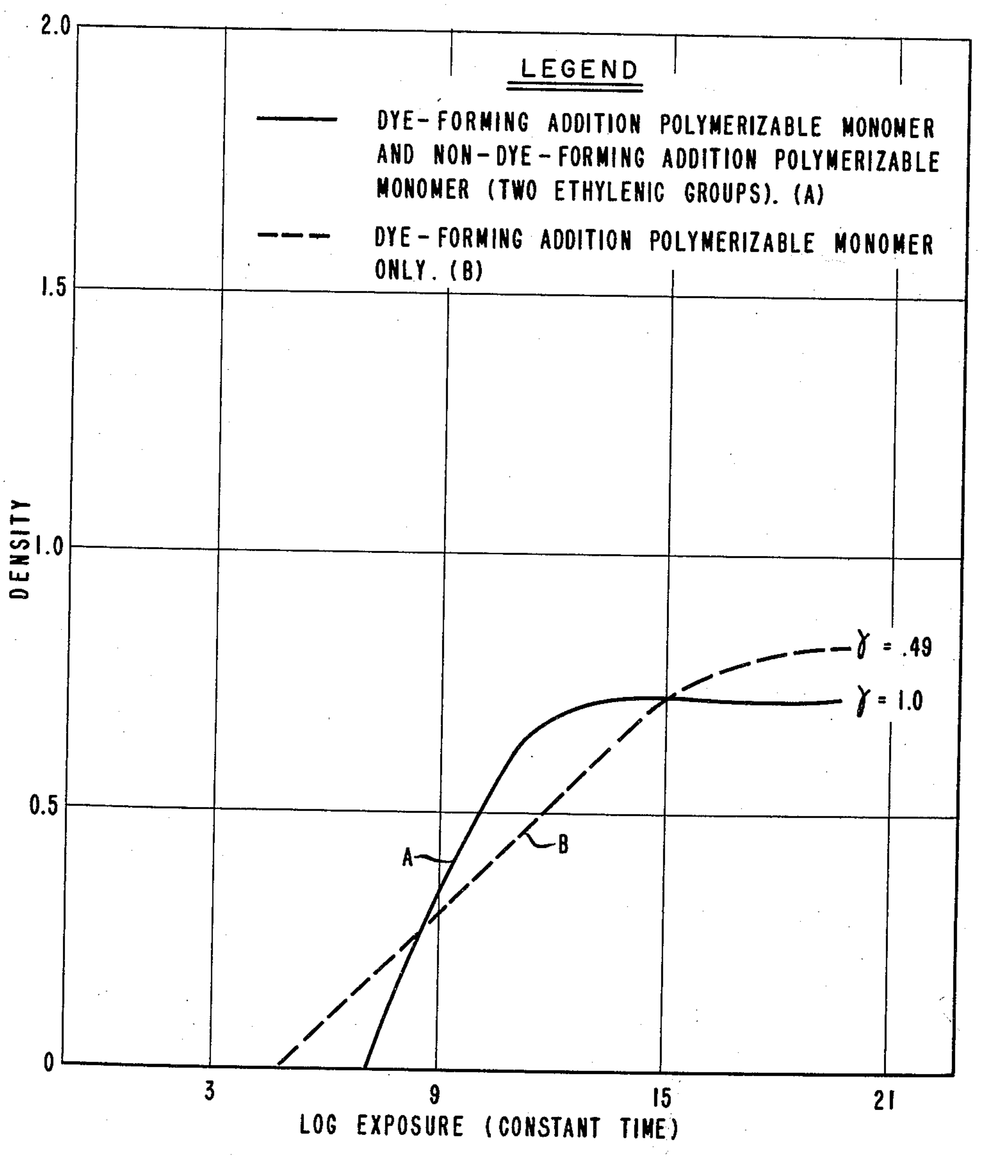
INVENTORS
ABRAHAM BERNARD COHEN
JOHN CHARLES FIRESTINE
BY Lynn Barratt Morris
ATTORNEY United States Patent Office 3,070,442

Patented Dec. 25, 1962

3,070,442

PROCESS FOR PRODUCING COLORED POLYMERIC RELIEF IMAGES AND ELEMENTS THEREFOR

Abraham Bernard Cohen, Springfield, and John Charles Firestine, South River, N.J., assignors to E. I. du Pont de Nemours and Company, Wilmington, Del., a corporation of Delaware Filed July 18, 1958, Ser. No. 749,470

16 Claims. (Cl. 96—35)

This invention relates to processes for producing colored images by the exposure of selected areas of a layer containing an essentially colorless, addition polymerizable monomer having at least one terminal ethylenic group and containing a dye nucleus capable of forming a quinoneimine or azomethine dye upon coupling with a second component, an addition polymerization initiator and a suitable binding agent. The invention also relates to new photopolymerizable compositions and elements useful in said processes.

An object of this invention is to provide new processes for forming colored images. Another object is to provide such processes which are simple and dependable. Yet another objective is to provide such processes which do not require expensive light-sensitive silver salts. A further object is to provide such processes which enable one to obtain a wide range of colors and shades. A still further object is to provide such processes which have good speeds and versatility and produce high quality images. Related objects are to provide new photopolymerizable compositions and elements for use in the aforesaid processes.

The novel processes of this invention embody (1) exposing to actinic light selected portions of a photopolymerizable layer comprising (*a*) an essentially colorless, addition polymerizable ethylenically unsaturated monomer having at least one terminal ethylenic group and containing a dye nucleus capable of forming a quinoneimine or azomethine dye upon reacting with a further dye-forming component, (*b*) an addition polymerization initiator activatable by actinic light and (*c*) a binder for the aforesaid ingredients until substantial polymerization to a high polymer containing recurring dye nuclei occurs, (2) removing unexposed and unpolymerized material from the layer and (3) reacting the exposed and polymerized image portions of the layer with a dye-forming component to form a colored polymeric image, said latter two steps may be carried out simultaneously or in either order, provided the dye formed is soluble in the solvent chosen to wash out the unpolymerized material.

The monomeric compounds of item (*a*) above, in general, consist of an aromatic or heterocyclic nucleus to which there is linked directly or indirectly at least one ethylenic group of the formula $$CH_2{=}\underset{\substack{|\\R}}{C}{-}$$

where R is H, $CH_3$, $C_2H_5$ and at least one dye-forming nucleus as an integral part of its molecular structure. This dye-forming nucleus has as the active group a structure represented by the formula $$X{-}(\overset{|}{C}{=}\overset{|}{C})_n{-}\overset{|}{C}{=}\overset{|}{C}H$$

where X is aldehydo (OHC—), hydroxy (HO—) or primary or secondary amino (RHN— where R is hydrogen or an alkyl group of 1 to 4 carbon atoms) and *n* is 0 to 1. The "free" or "dangling" valences can, of course, be satisfied by various atoms or groups, e.g., hydrogen, halogen, carboxylic or sulfonic acid groups and their derivatives, fused rings, alkyl, aryl, alkoxy, aryloxy, etc. The hydrogen atom in the formula may be replaced by groups readily displaced in the coupling reaction, e.g., halogen atoms, carboxylic or sulfonic acid groups. This active group is found in the active methylene color formers or dye intermediates and in aromatic hydroxyl and amino compounds and includes the reactive ethenol, aminoethenyl, 4-hydroxy- and 4-amino-1,3-butadienyl groups. These groups occur in phenols, naphthols, aromatic amines, acylacetamides, betaketoesters, pyrazolones, homophthalimides, cyanoacetyl compounds, etc. The reactive ethenol group as represented by $$HO{-}\overset{|}{C}{=}CH{-}$$

occurs in phenols and naphthols which couple in the ortho position, and in the alkali soluble or enol form of most active methylene dye intermediates or color formers. These active methylene groups (—$CH_2$—) have a hydrogen rendered mobile by the proximity of certain unsaturated groups, for example, $$-NO_2,\ -\overset{|}{C}{=}CO,\ -\overset{|}{C}{=}N-,\ -C{\equiv}N$$

and others. The —$CH_2$— group is usually present between two such groups, e.g., $$-COCH_2CO-,\ -COCH_2CN,\ -COCH_2\overset{|}{C}{=}N-$$

in a cyclic or acyclic system. The enol forms of these examples are $$HO\overset{|}{C}{=}CH{-}CO{-},\ HO{-}\overset{|}{C}{=}CH{-}CN$$

and $$HO\overset{|}{C}{=}CH{-}\overset{|}{C}{=}N{-}$$

respectively.

The reactive aminoethenyl group $$RHN{-}\overset{|}{C}{=}CH{-}$$

occurs in aromatic amino compounds which couple in the ortho position.

The 4-hydroxy- and 4-amino-1,3-butadienyl groups represented as $$HO{-}\overset{|}{C}{=}\overset{|}{C}{-}\overset{|}{C}{=}CH{-}\quad\text{and}\quad RHN{-}\overset{|}{C}{=}\overset{|}{C}{-}\overset{|}{C}{=}CH{-}$$

occur in phenolic, naphtholic and aromatic amino compounds which couple in the para position. In general, the coupling in the case of aromatic hydroxyl or amino compounds will take place in the para position if this is substituted by hydrogen or a readily replaceable substituent.

In the preferred monomeric addition polymerizable dye-forming compounds, the terminal ethylenic group is linked directly to a benzene nucleus through an amide linkage —CONH—.

Upon dye formation with the dye-forming monomers by coupling with an oxidized primary aromatic amine-containing developing agent or with an aminoaldehyde, the resulting dyes have a nitrogen-containing linkage, e.g., —CH=N—, =N—, or —N=CH— between cyclic nuclei.

Representative examples of suitable monomers of the above type include m-methacrylamidobenzaldehyde, m-methacrylamidomethylcinnamaldehyde, m-acrylamidobenzaldehyde, m-crotonamidobenzaldehyde, m-methacrylamidophenol, 5-methacrylamido-1-naphthol, p-methacrylamidophenol, o-methacrylamidophenol, p-methacrylamidoaniline, 2,4-dimethacrylyloxybenzaldehyde, 2,4-dimethacrylamidophenol, p-methacrylyloxybenzaldehyde, 1-phenyl-3-methacrylamido-5-pyrazolone and m-methacrylamido-alpha-benzoylacetanilide. Procedures for the preparation of these compounds are given below.

Suitable addition polymerization initiators activatable by actinic light which can be used as ingredient (*b*) include vicinal ketaldonyl compounds, e.g., diacetyl, benzil, etc.; alpha-ketaldonyl alcohols, e.g., benzoin, pivaloin, etc.; acyloin ethers, e.g., benzoin methyl or ethyl ethers, etc.; alpha-hydrocarbon-substituted aromatic acyloins, including alpha-methylbenzoin, alpha-allylbenzoin (U.S. 2,722,512) and alpha-phenylbenzoin; the polynuclear quinones, such as anthraquinone, naphthoquinone, etc.; the O-alkyl xanthate esters (U.S. 2,716,633); and the like. The acyloin ethers are particularly useful. These initiators are generally used in an amount from 0.01 to 10% by weight of the entire composition.

The photopolymerizable compositions of this invention may, if desired, contain various other adjuvants or constituents commonly used in photopolymerizable compositions, e.g., plasticizers, addition polymerization inhibitors, stabilizers and compatible polymeric filler or binder materials. Suitable polymeric materials include hydroxyethyl cellulose, water-soluble methyl cellulose, cellulose acetate/hydrogen succinate and other cellulose ethers and esters having the characteristics defined in Martin and Barney U.S. application Ser. No. 596,766, filed July 9, 1956. Other suitable such materials include polyvinylpyrrolidones; polyacrylamides; vinylidene chloride/acrylonitrile copolymers; polyvinyl alcohol of viscosity 4–100 or more centipoises in 4% aqueous solution at 20° C.

In general, the above constituents (*a*), (*b*) and (*c*) of the photopolymerizable compositions of this invention are present in amounts from 5 to 99.9%, 0.1 to 30%, and 0 to 94.9% by weight. There may, of course, also be present one or more addition polymerizable ethylenically unsaturated monomers having at least one terminal ethylenic group capable of forming a high polymer by photoinitiated polymerization which are free from dye-forming nuclei. Suitable monomers of this type are described in Plambeck U.S. Patent 2,760,863. They usually have a normal boiling point above 10° C., a molecular weight from 100 to about 1500, and at least one terminal ethylenic group for every 100–250 units of molecular weight. These monomers can be present in various amounts depending on the desired intensity of the final dye, or color, image. Usually the amount will not be more than 10 mols of non-dye forming monomer to 1 mol of the dye forming monomer.

The photopolymerizable compositions of this invention can be made by admixing the addition polymerizable dye forming monomer, the addition polymerization initiator and the bnder and, if desired, a suitable plasticizer or solvent and other desired adjuvants. The mixing can be accomplished with the aid of any conventional mixing or milling apparatus for plastic materials. The uniformly mixed composition is then formed into a suitable coating or layer on a support to form the novel photopolymerizable elements of this invention. Thus, a sheet of the composition can be made by milling and applied by pressing to the surface of a suitable support.

Alternatively, a solution of the constituents in a volatile solvent can be coated onto a support and the solvent allowed to evaporate. Suitable solvents include water-ethanol mixtures preferably about of equal parts by volume and water/acetone mixtures preponderating in the latter (e.g., 25/300 parts by volume).

The thickness of the layers may vary widely depending upon the use for the photopolymerizable layer. For prints, the layers can be from 0.1 to 1 mil in thickness. Where height reliefs are desired they may be thicker, e.g., from 1 to 250 mils or more.

The invention will be further illustrated but is not intended to be limited by the following examples.

EXAMPLE 1

To a 250-ml. Erlenmeyer glass flask there were added 25 ml. of a solution of 100 g. of polyvinyl alcohol (88% hydrolyzed, viscosity of 4% aqueous solution 4–6 centipoises at 20° C.) in 500 ml. of water and 500 ml. of ethanol (95%), 5 g. m-methacrylamidobenzaldehyde and 1 g. benzoin methyl ether. The mixture was stirred until completely dissolved. The solution was coated under subdued light onto the surface of 6 by 8 inch pieces of white poster board. It was then allowed to dry at room temperature. This photopolymerizable element was placed in a vacuum printing frame with its sensitive surface in contact with the gelatin surface of a continuous tone negative under a transparent 7 mil thick biaxially oriented polyethylene terephthalate film cover of said frame. The photopolymerizable layer was exposed for 5 seconds through said negative to light from a 275-watt R.S. sun lamp (mercury vapor) placed 8 inches above said film. The exposed photopolymerizable element was removed and then developed for about 1 minute in a 10% solution of p-aminodiethylaniline hydrochloride in 85% ethanol. The unexposed areas were washed free of soluble monomer with ethanol as solvent, leaving an orange positive print in the exposed and polymerized areas. The print was of good quality with high resolution, low stain in unexposed areas, and medium contrast. Other satisfactory prints were obtained over an exposure range of 1–15 seconds.

EXAMPLE 2

A 25-ml' solution like that in Example 1, except that m-acrylamidobenzaldehyde was substituted for the unsaturated monomer thereof and 2 g. of benzoin methyl ether was used, was made and coated onto white poster board and the coated elements were dried in like manner.

The sensitized elements were exposed through negatives after the manner described in Example 1 to a 275-watt R.S. sun lamp for 15 and 20 seconds respectively. The exposed elements were developed with a 10% solution of p-aminodiethylaniline hydrochloride in 85% ethanol. The unexposed areas were washed free of soluble monomer with 95% ethanol as solvent, leaving orange positive prints. The prints were of good quality with high resolution, low stain in the exposed areas, and medium contrast.

EXAMPLE 3

To a 250-ml. reaction vessel, there were added 50 ml. of a solution of 25 g. of vinylidene chloride/acrylonitrile (80/20) copolymer in 300 ml. acetone, 2 g. of m-methacrylamido-alpha-cinnamaldehyde, and 1 g. benzoin methyl ether. The mixture was warmed to 50° C. on a steam bath until completely dissolved. This solution was coated on a 6 by 8 inch piece of white poster board under subdued light. It was then allowed to dry at room temperature.

The sensitized support was exposed through a continuous tone negative after the manner described in Example 1 to a 275-watt R.S. sun lamp for 2 minutes whereby addition polymerization to a high polymer took place in the exposed areas. It was then developed for 1 minute with a 10% solution of p-aminodiethylaniline hydrochloride in 85% ethanol. The unexposed areas were washed free of soluble monomer with ethanol as solvent, leaving a magenta positive print in the polymerized areas.

EXAMPLE 4

A 100 ml. solution like that in Example 1, except that 10 g. of p-methacrylyloxybenzaldehyde was substituted for the unsaturated monomer thereof, was made and coated onto white poster board and the coated elements were dried in like manner.

The sensitized element was exposed through a continuous tone negative after the manner described in Example 1 to a 275-watt sun lamp for 2 minutes. It was then developed with a 10% solution of a p-aminodiethylaniline hydrochloride containing 85% ethanol. The unexposed areas were washed free of soluble monomer with ethanol as solvent leaving a yellow positive print in the polymerized areas. The print was of good quality with high resolution, low stain in unexposed areas, and medium contrast.

EXAMPLE 5

To 50 ml. of a polyvinyl alcohol solution like that in Example 1, 5 g. of p-methacrylamidophenol, 1 g. benzoin methyl ether and 5 ml. of 5% NaOH were added, and coated onto white poster board which was dried as in Example 1.

The sensitized element was exposed through a continuous tone negative after the manner described in Example 1 to a 275-watt R.S. sun lamp for 1 minute. It was then developed for 1 minute in a 10% p-aminodiethylaniline hydrochloride solution in 85% ethanol. The developed area was then treated with an alcohol-water solution of potassium ferricyanide followed by a 5% alcohol solution of sodium hydroxide. A deep blue positive image formed in the exposed, polymerized areas. The unpolymerized areas were washed free of unpolymerized monomer with ethanol to give the desired print.

EXAMPLE 6

A solution was prepared containing 50 ml. of polyvinyl alcohol of the type described in Example 1, 4 g. m-methacrylamidophenol and 2 g. of benzoin methyl ether dissolved in 50 ml. of ethanol. The mixture was stirred until completely dissolved and coated onto white poster board after the manner described in Example 1 and the coated element was dried in like manner. A second coating of the above solution was applied and it was allowed to dry. The sensitized element was exposed for one minute through a continuous tone negative after the manner described in Example 1 and then developed with a 10% p-aminodiethylaniline hydrochloride solution in 85% ethanol. The layer was then oxidized by treating it with an ethanol solution of sodium dichromate to yield a deep blue positive image. The unexposed areas were washed free of unpolymerized monomer with 95% ethanol.

EXAMPLE 7

A 300-ml. polyvinyl alcohol solution like that in Example 1 except that 2 g. of 5-methylacrylamido-1-naphthol was used as the unsaturated monomer, was made and coated onto white poster board which was dried in the manner described in Example 1.

The sensitized element was then exposed for 15 minutes through a negative after the manner described in Example 1 and then developed for about one minute in a 10% solution of p-aminodiethylaniline hydrochloride in 85% ethanol.

The developed area was oxidized with an alcohol solution of sodium dichromate and 2% alcohol solution of sodium hydroxide to yield a deep blue positive image. The unexposed areas were washed free of unpolymerized monomer with ethanol.

EXAMPLE 8

A 50-ml. polyvinyl alcohol solution like that of Example 1, except that 5 g. of p-methacrylamidoaniline was used as the unsaturated monomer, was made after the manner described in said example. The solution was made acid with dilute hydrochloric acid and coated onto white poster board which was dried after the manner described in said example.

The sensitized element was exposed for 2 minutes after the manner described in Example 1 and was then developed for about 1 minute with an ethanol solution of p-dimethylaminobenzaldehyde to give a positive yellow image. The unexposed areas were washed free of unpolymerized monomer with 95% ethanol.

EXAMPLE 9

A solution of 4 g. of 2,4-dimethacrylamidophenol, 2 g. benzoin methyl ether and 50 ml. of the polyvinyl alcohol solution described in Example 1 was made, coated and allowed to dry as described in said example. The sensitized element was then exposed for 3 minutes after the manner described in Example 1.

The exposed print was developed in a solution prepared by dissolving 2 g. of the zinc chloride salt of p-diethylaminobenzene diazonium chloride in 50 ml. of 95% ethanol which was made basic with ammonia. A violet positive image was obtained.

Alternatively, the same exposed print was exposed to oxidized p-diethylaminoaniline as in Example 6 to yield a deep blue positive image.

EXAMPLE 10

To a 250-ml. reaction vesel there were added 50 ml. of polyvinyl alcohol solution described in Example 1, 5 g. of 2,4-dimethacrylyloxybenzaldehyde, and 2 g. of benzoin methyl ether. The mixture was stirred until completely dissolved and was coated on a 6 by 8 inch white poster board under subdued light. It was allowed to dry at room temperature.

The sensitive support was exposed through a negative to a 275-watt R.S. sun lamp for 30 seconds. It was then developed for about 1 minute with a solution of 10% p-aminodiethylaniline hydrochloride in 85% ethanol yielding a high contrast yellow positive image. The unexposed areas were washed free of unpolymerized monomer with 95% ethanol.

EXAMPLE 11

To a 250 ml. glass reaction vessel there was added 8 g. gelatin, 125 ml. water, 75 ml. ethanol, 5 g. m-methacrylamidobenzaldehyde, and 5 g. benzoin methyl ether. The mixture was stirred until completely dissolved.

(*a*) This solution was coated onto 4-mil polyethylene terephthalate film base and on photographic grade paper (without baryta coating) under subdued light, and air dried.

Each of the sensitized supports were exposed through a negative for 30 second under a 275-watt R.S. sun lamp and then developed with a 10% p-aminodiethylaniline hydrochloride 85% ethanol solution. Orange yellow color positive prints were obtained. These prints were washed with 95% ethanol and air dried. The prints described showed medium contrast.

(*b*) To 50 ml. of the above solution there was added 2 g. triethylene glycol diacrylate (TDA). This solution was coated on polyester film and paper as above under subdued light and air dried.

Each of the sensitized elements containing TDA were exposed for 30 seconds after the manner described in Example 1 and then developed with a 10% p-aminodiethylaniline hydrochloride 85% ethanol solution. Orangle-yellow colored positive prints were obtained. The prints were washed with 95% ethanol. Those prints containing a di-vinyl monomer showed high contrast while those employing the color-former monomer with a single ethylenic group and free from TDA only showed medium contrast. The density curves from these prints are shown in the accompanying drawing.

EXAMPLE 12

Example 1 was repeated except that 50 ml. of the three different polyvinyl alcohol solutions were used in place of the 25-ml. solution of that example.

Solution 1 consisted of polyvinyl alcohol (88% hydrolyzed, viscosity of 4% aqueous solution—19 to 25 centipoises at 20° C.) 50 g., water 350 ml., 95% ethanol 350 ml.

Solution 2 consisted of polyvinyl alcohol (99% hydrolyzed polyvinyl acetate, viscosity of 4% aqueous solution—28 to 32 centipoises at 20° C.), 50 g., 450 ml. water and 450 ml. 95% ethanol.

Solution 3 consisted of polyvinyl alcohol (99% hydrolyzed polyvinyl acetate, viscosity of 4% aqueous solution—55–65 centipoises at 20° C.) 50 g., 350 ml. water and 350 ml. 95% ethanol.

In each case orange positive prints of good quality with high resolution, low strain in unexposed areas and medium contrast were obtained.

EXAMPLE 13

To a 125 ml. reaction vessel there were added 50 ml. 95% ethanol, 5 g. m-methacrylamidobenzaldehyde, and 1 g. benzoin methyl ether and 0.1 g. anthraquinone. The mixture was dissolved, and a solution of 5 g. of gelatin dissolved in 50 ml. of water was added. The resultant solution was coated on a 6 by 8 inch white poster board under subdued light and dried in air.

The sensitized support was exposed for 3 minutes through a negative under a 275-watt sun lamp. It was developed in a 10% solution of p-aminodiethylaniline hydrochloride in 95% ethanol. An orange-red image formed. The unpolymerized areas were washed free of monomer with the ethanol.

EXAMPLE 14

In a 250-ml. reaction vessel there were placed 50 ml. of a solution of 25 g. of hydroxyethylcellulose (viscosity 2% aqueous solution—30–50 centipoises at 25° C.) 250 ml. water and 250 ml. 95% ethanol, 5 g. m-methacrylamidobenzaldehyde, and 10 ml. of a 10% solution of benzoin methyl ether in ethanol. This solution was coated, exposed, developed and washed as described in Example 1 to give an orange-red image. The unexposed areas were washed free of unpolymerized monomer with 95% ethanol, leaving the desired print.

EXAMPLE 15

Example 14 was repeated except that the hydroxyethyl cellulose solution was replaced by an equal quantity of a solution of 25 g. of water-soluble methyl cellulose (viscosity 2% aqueous solution at 20° C.—15 centipoises) in 450 ml. water and 450 ml. 95% ethanol, to yield a satisfactory orange-red print.

EXAMPLE 16

To a 125-ml. reaction vessel there were added 50 ml. of a solution of 30 g. cellulose acetate/hydrogen succinate (mol. wt. 20,000–30,000, 28 mol percent succinyl and 60 mol percent acetyl) in 400 cc. acetone, 5 g. of m-methacrylamido-benzaldehyde, and 10 ml. of a 10% solution of benzoin methyl ether in 95% ethanol. The solution was coated on a piece of white poster board under subdued light and air dried. The sensitized support was exposed through a continuous tone negative to a 275-watt sun lamp for 30 seconds. It was then developed with a 10% solution of p-aminodiethylaniline hydrochloride in alcohol to give a deep red image. The unexposed areas were washed free of unpolymerized monomer with 95% ethanol leaving an excellent orange-red print.

EXAMPLE 17

Example 16 was repeated except that 50 ml. of a solution in 350 ml. water and 350 ml. 95% ethanol of 50 g. polyvinyl pyrrolidone having an average molecular weight of 40,000 (NKP 30 Antara) was used in place of the solution of cellulose, acetate/hydrogen succinate to yield a satisfactory orange-red print.

EXAMPLE 18

To a 250-ml. reaction vessel there were added 50 ml. of a solution in 450 ml. of water and 100 ml. 95% ethanol of 25 g. polyacrylamide (Polyacrylamide 50, viscosity of 4% aqueous solution 60–100 centipoises at 25° C.), 5 g. m-methacrylamidobenzaldehyde, and 10 ml. of a 10% solution of benzoin methyl ether in 95% ethanol. The resultant solution was coated on 6 by 8 inch white poster board and was air dried.

The sensitized support was exposed through a combination line and halftone negative for 1 min. to a 275-watt sun lamp and developed with a 10% solution of p-aminodiehtylaniline hydrochloride in 85% ethanol. A reddish-orange print was obtained.

EXAMPLE 19

To a 250-ml. reaction vessel there were added 50 ml. of a solution in 300 ml. acetone of 25 g. vinylidene chloride/acrylonitrile (80/20) copolymer, 5 g. m-methacrylamidobenzaldehyde, and 10 ml. of 10% benzoin methyl ether. The solution was coated on 6 x 8 inch white poster board and was air dried overnight under subdued light.

The sensitized support was exposed through a negative to a 275-watt sun lamp for 30 sec. It was then developed with a 10% solution of p-aminodiethylaniline hydrochloride in 85% ethanol to yield an orange print.

EXAMPLE 20

A solution composed of 50 ml. of polyvinyl alcohol solution described in Example 1, 5 g. of m-methacrylamidobenzaldehyde, and 10 ml. benzoin methyl ether dissolved in 15 ml. 95% ethanol was coated on each of the supports listed in Table I below and dried in air. The supports thus sensitized were exposed for 30 seconds through a negative to a 275-watt R.S. sun lamp 6 inches distant and developed with a 10% solution of p-aminodiethylaniline hydrochloride to give an image as described in Table I. In each case the unpolymerized monomer was removed by washing with ethanol to give a clear print.

TABLE I

| Support | Sub Coating or Treatment | Exposure (Seconds) | Results |
|---|---|---|---|
| .005" cellulose acetate | 3 mg. gelatin/dm.$^2$ | 60 | Red positive image. |
| Polyester film as described in U.S. 2,627,088 (coated with vinylidene chloride/methylacrylate/itaconic acid 85/15/2). | 5 mg./dm.$^2$ polyvinyl acetal prepared by reacting 5 g. of benzaldehyde with 100 g. of polyvinyl alcohol A of Table I. | 60 | Do. |
| Do | 3 mg. gelatin/dm.$^2$ | 30 | Do. |
| 11-mil. tin-plated steel | Metal lacquer | 60 | Reddish-orange positive image. |
| Aluminum | "Alodized" (metal oxide chromate surface). | 60 | Do. |
| Do | None | 60 | Do. |
| White bond paper | do | 60 | Red positive image. |
| Glass | do | 60 | Orange-red positive image. |
| Linen cloth | do | 60 | Red positive image. |
| Wood | 10 mg. gelatin/dm.$^2$ | 60 | Red-orange slight stain in unexposed areas. |
| Nylon cloth | None | 60 | Red Orange. |

In the foregoing and following examples the poster board (white) is made by coating plain chipboard on one or both surfaces with a white paper stock consisting of a mixture of bleached sulfite, de-inked paper stock, soft white shavings (waste from sulfite printing paper) and soda or unbleached sulfite. This coating is laid on in one stage of paper board making.

EXAMPLE 21

A solution composed of 200 ml. of stock solution (prepared by mixing 350 ml. water and 350 ml. 95% ethanol and adding 50 g. polyvinyl alcohol, 88% hydrolyzed polyvinyl acetate, viscosity 4% aqueous solution—19–25 centipoises at 20° C.) containing 15 g. of m-methacrylamidobenzaldehyde and 3 g. of benzoin methyl ether dissolved in 125 ml. of ethanol was coated on poster board. When dry it was exposed for 30 seconds as described in Example 18 and developed in a solution containing 10 g. p-phenylenediamine, 10 ml. water, 10 ml. conc. hydrochloric acid and 100 ml. 95% ethanol. After washing in ethanol an orange positive image was obtained.

EXAMPLE 22

Example 21 was repeated except that the developer used was a solution of 5 g. of p-aminophenol in 100 ml. of 95% ethanol made just acid to litmus. After development and washing in ethanol, a yellow positive print was obtained.

EXAMPLE 23

A sheet of fine, ash-free filter paper (6 inches in diameter) was immersed in a solution of 2 g. methyl benzoin ether and 5 g. m-methylacrylamidobenzaldehyde in 25 ml. of 95% ethanol and then dried under room conditions in subdued light. The sensitized support was exposed and developed as in Example 1. The unexposed areas washed out leaving a fine quality orange-red print as a part of the paper structure that had good visibility from either side.

EXAMPLE 24

Example 21 was repeated except that p-aminobenzoic acid was substituted for the p-phenylenediamine in the developer of that example. After development and washing in ethanol, a yellow positive print was obtained.

EXAMPLE 25

A solution composed of 50 ml. of the polyvinyl alcohol solution of Example 1, 5 g. m-methacrylamidobenzaldehyde and 2 g. benzoin methyl ether dissolved in 15 ml. 95% ethanol was coated on white poster board, dried, exposed as described in Example 20 and developed in a solution like that of Example 21, except that 1,5-naphthalene diamine was substituted for the p-phenylenediamine. After development and washing in 95% ethanol, a yellow positive print was obtained.

EXAMPLE 26

Example 25 was repeated except that the following solution was substituted for the developer thereof:

| | | |
|---|---|---|
| p-Amino-N-ethyl-alpha(p-sulfophenyl) propylaniline hydrochloride | g. | 5 |
| Water | ml. | 50 |
| 95% ethanol | ml. | 50 |

When the developed element was washed, first with water and then with ethanol, a pink positive image was obtained.

EXAMPLE 27

A solution was prepared from 8 g. of gelatin, 125 ml. water and 75 ml. 95% ethanol. To 50 ml. of this solution were added 5 g. m-methacrylamidobenzaldehyde and 2 g. benzoin methyl ether dissolved in 15 ml. 95% ethanol. This solution was coated on film base having a conventional gelatin sublayer which had been coated on a copolymer (vinylidene chloride/methylacrylate/itaconic acid) sublayer carried by a polyethylene terephthalate film base made as described in Alles et al. U.S. Patent 2,627,088. When dry the film was exposed under a combination line and halftone negative for 30 sec. to a sun lamp as described in the preceding examples, then washed with ethanol, developed with a 10% solution of N-methyl-p-phenylenediamine hydrochloride in 85 parts 95% ethanol and 15 parts water, and again washed with ethanol, an orange positive print of exceptional clarity was obtained. The print had cleaner unexposed areas than one from coated poster board that was processed the same way.

EXAMPLE 28

A solution of the following composition was prepared, coated on white poster board under subdued lights, and dried in air:

| | | |
|---|---|---|
| o-Methacrylamidophenol | g. | 2 |
| Polyvinyl alcohol solution of Example 1 | ml. | 25 |
| Benzoin methyl ether | g. | .5 |

The photosensitive element was exposed for 1 minute through a combination line and halftone negative to a 275-watt R.S. sun lamp at a distance of 8 inches. The exposed element was then treated successively with a 2% alcoholic NaOH solution, a 2% alcoholic solution of potassium dichromate, a solution of p-aminodiethylaniline hydrochloride in 85% ethanol and finally with ethanol. A blue green positive image was obtained.

EXAMPLE 29

A blue green positive print was prepared in the same manner as in Example 28 by substituting vinyl salicylate for o-methacrylamidophenol.

EXAMPLE 30

The following solutions were made up and coated on separate pieces of 6" x 8" white poster board and dried at room temperature:

| | |
|---|---|
| Solution I | 50 ml. polyvinyl alcohol solution of Example 1<br>5 g. m-methacrylamidobenzaldehyde<br>2 g. benzoin methyl ether in 15 ml. percent ethanol |
| Solution II | 10 g. p-aminodiethylaniline hydrochloride<br>100 ml. ethanol<br>10 ml. water |

The photosensitive element prepared from solution I was exposed for 2 minutes through a combination line and halftone negative to a 275-watt R.S. sun lamp 6 inches away. The developer element (II) made from solution II was then placed coated side down in contact with the coated surface of the photosensitive element (I). A flat-iron heated to about 150° C. was placed on the back surface of II whereupon an orange-brown direct positive image formed almost instantaneously on the coated surface of (II). This image seems to be formed by migration of the unpolymerized color-former in (I) to (II) where it is coupled with the developer. It was found that by using exposure times shorter than 1 minute it was possible to also get a negative image in (I) as well as the direct positive in (II).

EXAMPLE 31

A coating was prepared under subdued lights on a 6 inch square ¼ inch thick glass plate from a solution of 25 ml. of the polyvinyl alcohol solution of Example 21, 1 g. m-methacrylamidobenzaldehyde and 0.1 g. $\alpha,\alpha'$-azodiisobutyronitrile. The coated side of the glass plate was placed against a black and white image and exposed by reflex for 5 minutes through the glass plate to a 250-watt infrared heat lamp 6 inches away. The exposed plate was allowed to cool and then it was developed in a solution of p-diethylaminoaniline hydrochloride in 85% ethanol yielding a direct positive deep orange image. In this case thermal polymerization occurred in the exposed areas as a result of infrared absorption by the black image which transferred its heat to the polymerizable coating with which it was in contact. The original image was solid black on white paper.

The invention, of course, is not limited to the use of the specific addition-polymerizable ethylenically unsaturated monomers having at least one terminal ethylenic group and a quinoneimine or azomethine dye nucleus which are described above. Various other such compounds can be made by reacting color-forming compounds containing an amino group suitable for conversion to unsaturated amides by reaction with ethylenically unsaturated acid halides, for example, aminophenols, aminonaphthols, aminohydroxydiphenyls and aminosubstituted pyrazolones; acetoacetic acid esters; isoxazoles; coumarones; oxindols and cyanoacetophenones. Suitable specific compounds include:

5-aminoresorcinol
o- and m-aminophenol
Salicyl-para-aminoanilide
8-amino-2-naphthol
1-amino-5-naphthol
7-amino-2-naphthol
5-chloro-8-amino-2-naphthol
Acetoacetic acid-para-aminoanilide
Monoacetoacetic acid benzidide
1-(3-amino-5-sulfophenyl)-3-methyl-5-pyrazolone
1-(3-aminophenyl)-3-methyl-5-pyrazolone
1-phenyl-3-amino-5-pyrazolone
3-hydroxy-4-aminodiphenyl
4,4'-diamino-3,3'-dihydroxydiphenyl
2-(3-aminophenyl)-8-hydroxyquinoline
3-aminorhodanine
3-hydrazinorhodanine
2-methyl-4-amino-4'-hydroxy-4,8-benzoquinoline
4-(3-hydroxyphenylamino)aniline
6-aminoindazolone
2-amino-6-hydroxyquinoline
2,5-diaminophenol The actinic light may vary from 1800 to 7000 A. and suitable sources are described in Plambeck 2,760,863.

The following are suitable procedures for the preparation of ethylenically unsaturated dye-forming monomers described above and analogous compounds.

*Procedure 1.—m-Methacrylamidobenzaldehyde*

Into a 2-liter, three-necked, round-bottomed flask fitted with a stirrer and thermometer there was placed 35 g. of anhydrous $K_2CO_3$ dissolved in 140 ml. water and to that solution was added 33 g. (0.2 mol) of m-aminobenzaldehyde ethylene glycol acetal. The mixture was cooled to 0° C. with stirring, and 20.9 g. of methacrylyl chloride dissolved in 100 ml. of dioxane was added dropwise. Near the end of the addition a white solid gradually separated from the solution. After the addition was complete, the mixture was stirred for 15 minutes. The white solid was filtered by suction and washed with water. The solid was then suspended in 100 ml. of 3 N hydrochloric acid and stirred, whereupon most of the solid dissolved. The solution was warmed on the steam bath to 30° C. and cooled in ice. The solid was filtered on a Büchner funnel, washed with water, and air dried. It was then purified by recrystallization from ether solution following treatment with activated carbon to yield 20 g. of an almost white solid (m-methacrylamidobenzaldehyde), M.P. 58–60° C. (59% of the theoretical).

*Analysis.*—Calcd. for $C_{11}H_{11}NO_2$: C, 69.84; H, 6.01; N, 7.39. Found: C, 69.21; H, 5.873; N, 7.4.

A water soluble bisulfite complex of the above compound was prepared by mixing 9.9 g. of m-methacrylamidobenzaldehyde in 50 ml. of ethanol with 5.2 g. of sodium bisulfite in 25 ml. of water. After allowing to stand 2 hours 9.6 g. of a white solid was filtered off and washed with ethanol.

*Procedure 2.—m-Methacrylamido-α-Methylcinnamaldehyde*

To a 1-liter Erlenmeyer flask fitted with a reflux condenser there was added with stirring 13.2 g. (0.02 mol) m-methacrylamidobenzaldehyde, 200 ml. ethanol, 350 ml. water and 7 ml. propionaldehyde. The ingredients were all dissolved at this stage. To the above solution 7 ml. of 10% aqueous NaOH was added. The solution gradually turned cloudy, and the desired product started to crystallize out of solution. After standing for 16 hrs., the product was filtered by suction filtration, washed with ethanol and then ether, and air dried to yield 10 g. of straw-colored glistening platelets (m-methacrylamido-α-methylcinnamaldehyde), M.P. 142–144° C. (60% of the theoretical).

*Analysis.*—Calcd. for $C_{14}H_{15}NO_2$: C, 73.3; H, 6.55; N, 6.12. Found: C, 73.26; H, 6.68; N, 6.15.

*Procedure 3.—m-Acrylamidobenzaldehyde*

Into a 500-ml. three-necked, round-bottomed flask fitted with a stirrer and thermometer there was placed 35 g. anhydrous $K_2CO_3$ dissolved in 140 ml. of water, followed by the addition of 33 g. (0.2 mol) m-aminobenzaldehyde ethylene glycol acetal. The mixture was cooled to 0° C. with stirring, and 18.1 g. (0.2 mol) of acrylyl chloride dissolved in 100 ml. of dioxane was added dropwise. A white solid gradually separated near the end of the addition. After the addition was complete, the mixture was stirred for 15 minutes. The white solid was removed by suction filtration and washed with water. It was then added slowly with stirring to 100 ml. of 3 N hydrochloric acid and warmed at 30° C. on a steam bath in order to hydrolyze the acetal group to the aldehyde. After cooling in an ice bath the product separated as a white solid which was collected by filtration and washed with water and then purified by recrystallization from an ether solution after treatment with activated carbon to yield 10.5 g. of white solid (m-acrylamidobenzaldehyde), M.P. 100–103° C. (31% of the theoretical).

*Analysis.*—Calcd. for $C_{10}N_9NO_2$: C, 68.5; H, 5.1; N, 8.0. Found: C, 68.62; H, 5.44; N, 7.99.

*Procedure 4.—m-Crotonamidobenzaldehyde*

To a 500 ml. three-necked, round-bottomed flask fitted with a stirrer and thermometer was added 35 g. anhydrous $K_2CO_3$ dissolved in 140 ml. water. To this was added 33 g. (0.2 mol) m-aminobenzaldehyde ethylene glycol acetal in one portion. The mixture was cooled to 0° C., and 21 g. (0.2 mol) crotonyl chloride dissolved in 100 ml. dioxane was added dropwise. A viscous oil gradually separated. Upon completion of the addition, the mixture was diluted with water to give further separation of oil. The oily layer was poured into a separatory funnel and separated from the water. The oil was treated with 100 ml. 3 N hydrochloric acid and heated on the steam bath to 30° C. The oil turned a deep yellow color, and, after being poured onto cracked ice, the product solidified. It was then extracted with ether, and the ether extracts were combined and dried over $K_2CO_3$. The ether was filtered and evaporated. The product (m-crotonamidobenzaldehyde) crystallized on cooling as a white solid. Yield 10 g., M.P. 79–80° C. (25% of the theoretical).

*Analysis.*—Calcd. for $C_{11}H_{11}NO_2$: C, 69.8; H, 5.83; N, 7.42. Found: C, 69.3; H, 5.92; N, 7.30.

*Procedure 5.—m-Methacrylamidophenol*

To a 500 ml. three-necked, round-bottom flask fitted with a stirrer and thermometer was added 200 ml. dry pyridine and 21.8 g. (0.2 mol) m-aminophenol. The mixture was stirred and cooled to 0° C., and 20.9 g. (0.2 mol) of methacrylyl chloride was added dropwise, the temperature being maintained between 0° C. and 5° C. After addition was complete, the solution was allowed to warm to 25° C. It was then poured onto cracked ice. The desired product separated as a white

*Procedure 14.—m-Methacrylamido-Alpha-Benzoylacetanilide*

To a 1 liter 3-necked flask fitted with a stirrer, dropping funnel and a Vigreux distilling column there were added 84.4 g. (0.44 mol) ethyl benzoyl acetate in 100 ml. dry xylene and 52.8 g. (0.4 mol) m-nitroaniline in 200 ml. xylene. After the two solutions were thoroughly mixed, the ethanol formed by the reaction was distilled off. The solution was then cooled whereup a solid separated out which was filtered off, washed with xylene and dried in air. The yield of m-nitro-alpha-benzoyl acetanilide which melted at 143–5° C. was 79 g. (78% of theory).

A mixture of 28.4 g. of the m-nitro-alpha-benzoylacetanilide, 200 ml. of absolute ethanol and 0.2 g. of catalytic palladium on charcoal was placed in the reaction bottle of a low pressure catalytic hydrogenation apparatus (Parr, shaker type) and reacted at 60 lbs. per sq. in. pressure, until the calculated amount of hydrogen was taken up. The crude product which separated out was redissolved by heating and the catalyst filtered off. On cooling 16 g. (50% of theory) of a white solid, m-amino-alpha-benzoylacetanilide, separated out, M.P. 160–162° C.

To a 250-ml. Erlenmeyer flask was added 25.4 g. of the m-amino-alpha-benzoylacetanilide and 15.6 g. of methacrylyl chloride. The mixture was heated on a steam bath at 60° C. for 10–15 minutes and then cooled by addition of cracked ice. The reaction mixture was stirred with 100 ml. of 5% sodium carbonate, and the solid was filtered off, washed with water and acetone successively and recrystallized from 1 liter of ethanol. The yield of the white solid, m-methacrylamido-alpha-benzoylacetanilide, obtained was 8 g. (20% of theory); M.P. 204–200° C.

Suitable ethylenically unsaturated acid halides include methacrylyl chloride, methacrylyl bromide, acrylyl chloride, and acrylyl bromide.

While acylation of amino or hydroxyl groups of an unsaturated molecule by an acid chloride of a dye forming molecule or the reverse is a convenient way of joining the polymerizable group to the color-forming group, the free acid, acid anhydride or ester of either member could also be used. The unsaturated group can also be attached directly to the color-forming group such as in styrene or allyl derivatives. Alternatively, color-forming derivatives of acrylic acid can be made by attaching the color-forming group to either the alpha or beta carbons of acrylic acid or its derivatives.

Other color developing agents, which can be used in the processes of the invention, include:

Acetamido-p-phenylenediamine
Chlor-p-phenylenediamines
Monoethyl-p-phenylenediamine
p-Aminodimethylaniline
p-Aminodibutylaniline
N-p-aminophenylenepiperidine
1,2,5-toluylenediamine
2-amino-5-diethylaminotoluene
p-Amino-N-phenylmorpholine
N-methyl-N-hydroxyethyl-p-phenylenediamine
N-butyl-N-hydroxyethyl-p-phenylenediamine
2-amino-5-[N-butyl-N-hydroxyethyl]aminotoluene
Beta-gamma-dihydroxypropyl-p-phenylenediamine
1,2,3,4-tetrahydro-6-aminoquinoline
1,2,3,4-tetrahydro-6-amino-quinoxaline
p-Phenylene diamine derivatives of U.S. Patent 2,163,166

Practically any diazo compound can be used to react with the polymers having the structure $$HO-(\overset{|}{C}=\underset{|}{C})_n-\underset{|}{C}=CH$$

e.g., diazonium salts, syndiazotates, diazo-anhydrides, and diazo inner salts of the general formula A—N=MX wherein A is an aromatic or an unsaturated heterocyclic residue or compounds resulting from intramolecular elimination of HX therefrom. X may be OH or alkali metal or ammonium salts thereof or salt-forming anions, e.g., $Cl^-$, $Br^-$, $NO_3^-$ and $SO_3H^-$. Elimination of HX is exemplified by salts such as diazotized o-aminophenol and diazotized sulfanilic acid. The preferred compounds are those which are sufficiently stable to remain in solution without decomposition for an appreciable length of time. Among such compounds may be mentioned (1) tetrazotized benzidine derivatives which can be substituted by nitro, halogen, alkoxy, trifluoromethyl and sulfonic acid groups, (2) diazotized 4-nitroaniline derivatives wherein the 2-position can be substituted by halogen, alkoxy, alkyl, trifluoromethyl, sulfonic acid, nitro and carboxylic acid groups and wherein the 6-position is occupied by one of the groups consisting of hydrogen, halogen, nitro, sulfonic, carboxyl, alkyl, haloalkyl or alkoxy. Useful compounds include tetraazotized dianisidine, diazotized 2-chloro-4-nitroaniline, and diazotized p-nitro-aniline-o-sulfonic acid. Many other amine compounds which are suitable for diazotizing and coupling to azo dyes are well known, being described in Fierz-David, "Kunstliche Organische Farbstoffe," pages 87–204, and J. E. Cain, "The Chemistry of the Diazo Compounds," pages 6–26.

Oxidizing agents which may be used to oxidize compounds such as p-aminodiethylaniline salts, in addition to $K_3Fe(CN)_6$, are cupric sulfate; ferric chloride and bromide; sodium, potassium and ammonium permanganate and dichromate; ceric ammonium nitrate and light-exposed silver halide sols and dispersions.

In addition to the binding agents described in the examples, a wide variety of water- and solvent-soluble binders may be used, e.g., polyvinyl esters and acetals with and without color forming and/or solubilizing substituents including those described in Overman U.S. Patent 2,828,205 and Taylor et al. U.S. Patent 2,828,204; cellulose derivatives, e.g., lower alkyl ethers and esters, glycollates, regenerated cellulose; and amphoteric methacrylamide copolymers containing betaine groups, borate gellable methacrylamide copolymers and the amphoteric, borate gellable methacrylamide copolymers of Shacklett U.S. Patents 2,834,758, 2,830,972 and 2,833,650. In addition, binding agents such as gum arabic, starch glycollate, lac resins and various synthetic resins, e.g., solvent-soluble alkyd resins, polyacrylic and alkacrylic acids and esters and phenol/aldehyde and amino/aldehyde resins may be used.

As indicated in the examples, a wide variety of supports may be coated with the polymerizable compositions of the invention including metals, e.g., iron, steel, copper, aluminum and brass, sheets and plates; paper, cardboard, regenerated cellulose; ceramic materials, e.g., porcelain and earthenware; films of cellulosic esters and ethers or synthetic resins or superpolymers, e.g., polyacrylates and methacrylates, polystyrene, polyamides, polyesters, polycarbonate esters, polyvinyl esters and acetals and copolymers of vinyl and vinylidene compounds, e.g., vinyl chloride/vinyl acetate, vinylidene chloride/acrylonitrile, and glass. It should be understood that the binding agents and compositions coated on the various surfaces mentioned will be selected to give adequate adhesion between the coating and support.

The color-forming monomers described in this invention are soluble in organic solvents or in aqueous solutions prepared therefrom. Color-forming monomers having greater water-solubility can be prepared by introducing solubilizing groups such as sulfonic acid or carboxylic acid groups into the color-forming monomers. Water-soluble dyes may be obtained by introducing these same groups into the developer. With aldehydic colorformers, water-solubility may also be obtained by using bisulfite derivatives in place of the free aldehyde. Bisulfite derivatives of the aldehyde can be used as the free aldehyde provided the developer contains a component to inactivate the bisulfite as it is released.

solid. The solid was filtered by suction and washed with water. It was then slurried in ether and filtered by suction. The product (m-methacrylamidophenol), a white solid, weighed 10 g., M.P. 171–173° C. (28% of the theoretical).

*Analysis.*—Calcd. for $C_{10}H_{11}NO_2$: C, 67.7; H, 6.20; N, 7.92. Found: C, 67.4; H, 6.41; N, 8.01.

*Procedure 6.—5-Methacrylamido-1-Naphthol*

To a 500 ml. three-necked round-bottomed flask fitted with a stirrer and thermometer was added 200 ml. of dry pyridine and 31.836 g. (0.2 mol) of 5-amino-1-naphthol. The mixture was cooled to 0° C. with stirring, and 20.81 g. (0.2 mol) of methacrylyl chloride was added dropwise, the temperature being kept between 0° C. and 5° C. After addition was complete, the mixture was warmed to 30° C. It was then poured on cracked ice. The product that separated was filtered by suction filtration, washed with water, and then recrystallized from ethanol to yield 14 g. of a gray-white solid (5-methacrylamido-1-naphthol), M.P. 223–225° C. (31% of theoretical).

*Analysis.*—Calcd. for $C_{14}H_{13}NO_2$: C, 74; H, 5.7; N, 6.17. Found: C, 74.4; H, 5.96; N, 6.10.

*Procedure 7.—p-Methacrylamidophenol*

To a 500 ml. three-necked round-bottomed flask fitted with a stirrer and thermometer there were added 200 ml. of dry pyridine and 43.6 g. (0.2 mol) of recrystallized p-aminophenol. The mixture was stirred and cooled to 0° C., and 41.8 g. (0.4 mol) methacrylyl chloride was added dropwise, the temperature being maintained between 0° C. and 5° C. After addition was complete, the mixture was allowed to warm to 25° C. It was then poured on cracked ice. The solid that separated was filtered by suction filtration. It was then slurried in ether, filtered, and allowed to dry. The product (p-methacrylamidophenol) was a white solid weighing 15 g., M.P. 153–155° C. (55% of the theoretical).

*Analysis.*—Calcd. for $C_{14}H_{11}NO_2$: C, 68.0; H, 6.2; N, 7.9. Found: C, 67.5; H, 6.24; N, 7.8.

*Procedure 8.—o-Methacrylamidophenol*

A solution of 21.8 g. (0.2 mole) o-aminophenol in 150 ml. of dry pyridine was cooled to 0° C. and 21 g. (0.2 mole) methacrylyl chloride was added dropwise. After the addition was complete, the reaction mixture was warmed to 25° C. and then poured into ice water. The product was filtered, washed with water and dried in air. The crude product was then dissolved in ether, treated with activated charcoal and filtered. On evaporation of the ether from the filtrate 13 g. (34% of the theoretical yield) of a white solid (o-methacrylamidophenol) was obtained, M.P. 106–108° C.

*Procedure 9.—p-Methacrylamidoaniline*

In a 500-ml. three-necked, round-bottomed flask fitted with a stirrer and thermometer there were placed 200 ml. of dry pyridine and 27.6 g. (0.2 mol) of p-nitroaniline. The mixture was cooled to 0° C. with stirring, and 21 g. (0.2 mol) of methacrylyl chloride was added dropwise, the temperature being kept at 0° to 5° C. After complete addition of the methacrylyl chloride, the mixture was poured onto cracked ice. The yellow precipitate was filtered by suction, washed with water, and air-dried to yield 15 g. of solid, M.P. 151–153° C. (39% of the theoretical).

To a 500-ml. beaker was added 20.6 g. (0.1 mol) of the resulting p-nitromethacrylamidobenzene and 100 ml. of C.P. hydrochloric acid. The mixture was stirred and 100 g. tin, 30-mesh, was added gradually. The temperature was allowed to rise to 70° C. and was held at this temperature until solution was complete. The solution was decanted from the tin and then made alkaline with enough 20% NaOH to dissolve the tin double salt. The product (p-methacrylamidoaniline) crystallized out of solution during cooling. It was collected on a suction filter and washed with water and air-dried to yield 13 g. of almost white solid, M.P. 135–137° C. (74% of the theoretical).

*Procedure 10.—2,4-Dimethacrylyloxybenzaldehyde*

Into a 1-liter three-necked, round-bottomed flask fitted with a stirrer and thermometer was placed 140 g. potassium carbonate dissolved in 500 ml. water. To this was added 27.6 g. (0.2 mol) 2,4-dihydroxybenzaldehyde. The mixture was stirred and 36 g. (0.3 mol) acrylyl chloride dissolved in 400 ml. dioxane was added dropwise at 0° C. After complete addition of the acid chloride, the mixture was warmed to 30° C. The mixture was diluted with water and acidified with glacial acetic acid. The oily layer that separated was extracted with ether. The ether extracts were combined and dried over anhydrous $MgSO_4$. Upon filtration and evaporation of the ether a syrupy liquid was obtained. Yield, 32 g. (62% of the theoretical). This material (2,4-dimethacrylyloxybenzaldehyde) solidified after cooling for a long period; it was not purified but was used in the impure form.

*Procedure 11.—2,4-Dimethacrylamidophenol*

Into a 500-ml. round-bottom flask fitted with a stirrer was placed 12.3 g. (0.1 mole) 2,4-diaminophenol, 280 ml. water and 70 g. $K_2CO_3$. The mixture was cooled to 0° C. and maintained at that temperature while adding dropwise a solution of 42 g. (0.3 mole) methacrylyl chloride in 200 ml. dioxane. A product gradually separated out of solution. After the addition was completed, the mixture was warmed to 30° C. and then filtered. The product was washed with water and recrystallized from ether. The yield was 9 g. of a white solid, M.P. 119–21° C. This product was 2,4-dimethacrylamido-1-methacrylyloxybenzene.

*Analysis.*—Calcd. for $C_{18}H_{20}N_2O_4$: C, 65.8; H, 6.1; N, 8.5. Found: C, 65.9; H, 6.28; N, 8.36.

The above product was placed in 5% sodium hydroxide until solution occurred indicating hydrolysis of the phenol ester linkage. It was then acidified with acetic acid, filtered and recrystallized from ether to yield a white solid, M.P. 157–158° C., which was the desired product 2,4-dimethacrylamidophenol.

*Analysis.*—Calcd. for $C_{14}H_{16}N_2O_3$: C, 64.5; H, 6.15; N, 10.78. Found: C, 64.55; H, 6.12; N, 10.75.

*Procedure 12.—p-Methacrylyloxybenzaldehyde*

To a 250-ml. round-bottomed flask fitted with a stirrer and thermometer was added 11.2 g. KOH, 200 ml. water and 21.8 g. (0.2 mol) of p-hydroxybenzaldehyde. The mixture was cooled to 10° C. with stirring and 21 g. (0.2 mol) methacrylylchloride was added dropwise keeping the temperature between 10° C. and 15° C. The reaction mixture was then poured into ice water and acidified with hydrochloric acid. The product was extracted with ether, separated and dried over $MgSO_4$. The ether solution was filtered and the filtrate evaporated to yield a colorless liquid (p-methacrylyloxybenzaldehyde). Yield 10 g. (25% theory).

*Procedure 13.—1-Phenyl-3-Methacrylamido-5-Pyrazolone*

To a 500 ml. three-necked flask fitted with a stirrer and thermometer there were added 35 g. (0.2 mol) 1-phenyl-3-amino-5-pyrazolone and 200 ml. of dry pyridine. The mixture was stirred and the temperature held at 40–42° C. and 42 g. (0.4 mol) methacrylyl chloride added dropwise. After completion of the addition, the mixture was warmed to 75° C. It was then poured onto cracked ice and allowed to stand overnight. The above-named product was filtered on a suction filter, washed with water and then recrystallized from ethanol. Yield 24 g. pale yellow crystals, M.P. 170–171° C.

The polymerizable dye-forming monomers of this invention are useful for many purposes. When coated in layers, with or without a binder, they may be used in photographic systems based on exposure to ultraviolet, visible or infrared illumination behind a transparency or in the case of infrared systems on top of a transparency to form positive or negative images on development and washing in solvent. The images thus formed are useful in copying documents or making continuous tone copies of pictures such as portraits in a wide variety of colors by a suitable method. When coated on films they may be used to prepare sound records of either the variable density or variable area type.

The compositions of this invention are also useful in making prints by a transfer process where solubilized material in the unexposed areas is transferred to another carrier and subsequently hardened by light and/or heat to form a direct positive of the original subject. The compositions can be used to form patterns in color on metals, ceramics, textiles, glass, paper, wood and plastic films and foils. Alternatively, they may be used to form solid color in situ on such base materials, e.g., by over-all exposure to polymerizing radiation.

An advantage of this invention is that it provides new processes for producing colored images. Another advantage is that the processes are simple and dependable. A further advantage is that the processes enable one to obtain a wide range in color or shade of the image by a simple selection of the photopolymerizable element and/or developer solution.

A still further advantage is that the processes when compared to other non-silver salt sensitive systems, have better speeds, quality and greater versatility.

Most photosensitive organic compounds have a maximum quantum efficiency of one. However, with the photopolymerizable dye-forming monomers of this invention one quantum may initiate a chain reaction and thereby give rise to a quantum efficiency much greater than one. The basic mechanism whereby these monomers react in photosensitive systems is that their molecular size increases so that they are entrapped within the binder or they diffuse more slowly. Hence, only a low degree of polymerization is necessary to make this system workable. In some cases dimers and trimers may be sufficiently bulky to behave satisfactorily. As a result those monomers in light-sensitive systems are capable of even greater speeds than are conventional photopolymerizable systems that depend more on insolubilization than on diffusion.

From a quality standpoint the foregoing and equivalent dye-forming monomers are capable of giving grainless prints of very high resolution. In tests using a 160-line half-tone negative, for example, a print can be obtained in which even the finest dots are clearly visible. This high resolution cannot be duplicated in systems where the dye molecule does not have a polymeric chain of high molecular weight.

One can obtain an almost unlimited range of colors with these dye-forming monomers simply by choosing the proper dye-forming group from the many well-known classes of dyes formed by coupling reactions. Further modification of the color of a print can be made by using non-dye forming monomers as diluents, or mixing with other color forming monomers to get secondary colors or by use of alternate developers to get different colors with the same exposed plate. In addition, it is possible to react a dye-forming group with a developer which forms a dye containing another dye-forming group which can be modified by a second development.

For the most part, the monomers used in accordance with the invention follow known relationships between molecular weight and properties such as viscosity and solubility. Such monomers give prints of relatively low contrast. Difunctional monomers containing two or more polymerizable groups follow a different type of relationship between molecular weight and physical properties because of the cross-linking. This results in prints with high contrast. In the accompanying drawing, the curves illustrate the difference in contrasts with prints made (B) with the dye forming, polymerizable monomer and (A) with a mixture of such a monomer and an addition polymerizable monomer containing two terminal ethylenic groups, e.g., triethylene glycol diacrylate.

Intermediate contrasts may be obtained by proper mixing of monofunctional and difunctional monomers in formulating polymers where a wide rage of degrees of cross-linking is desired. To get a partially cross-linked dye-forming monomer one need not necessarily use a difunctional dye-forming monomer but can use any difunctional monomer which will copolymerize with the dye-forming monomer or behave as if it were a copolymer by forming an intimate mixture of two homopolymers, with the linear polymer trapped by cross-linked polymers.

A still further advantage of the invention is that the novel photopolymerizable elements are much lower in cost than photographic elements having light-sensitive silver halide layers. Still other advantages will be apparent from the foregoing disclosure.

We claim:

1. A process for producing colored images which comprises:

(1) exposing to actinic light, imagewise, a photopolymerizable layer comprising:

(*a*) an essentially colorless addition polymerizable monomer of the formula $CH_2{=}CR{-}CO{-}Z{-}Y$ wherein R is a member selected from the group consisting of hydrogen and methyl, Z is a member selected from the group consisting of —NH— and —O— and Y is a member selected from the group consisting of aromatic nuclei and heterocyclic nuclei containing uncharged hetero atoms containing as an active dye-forming nucleus a structure of the formula:

$$X{-}(\overset{|}{C}{=}\overset{|}{C})_n{-}\overset{|}{C}{=}\overset{|}{C}H$$

where X is a member selected from the group consisting of OHC—, HO—, R'HU— wherein R' is alkyl of 1–4 carbon atoms and $H_2N$—, and *n* is one of the cardinal numbers 0 and 1, said nucleus being capable of forming a dye selected from the group consisting of quinoneimine and azomethine dyes, (*b*) an addition polymerization initiator activatable by actinic light, until substantial polymerization of said monomer to a high polmer occurs in the exposed areas without polymerization in the unexposed areas of said layer.

(2) removing the unexposed and unpolymerized monomer from the layer by treating it with a solvent for said monomer, and (3) treating the exposed and polymerized image areas of the layer in a solution containing a dye coupling component to form a polymeric dye image.

2. A process according to claim 1 wherein step (3) is carried out before step (2).

3. A process according to claim 1 wherein step (2) is carried out before step (3).

4. A process according to claim 1 wherein steps (2) and (3) are carried out simultaneously.

5. A process according to claim 1 wherein said monomer is an amide of an aromatic aminoaldehyde with an acrylic acid.

6. A process according to claim 1 wherein said monomer is an amide of an aromatic aminoaldehyde with methacrylic acid.

7. A process according to claim 1 wherein step (3) is carried out by the use of an ethanol solution of p-aminodiethylaniline.

8. A process according to claim 1 wherein said layer also contains:

($c$) an organic polymeric binding agent for constituents ($a$) and ($b$).

9. A process according to claim 8 wherein the binder is a water-permeable organic colloid of high molecular weight having protective colloid properties.

10. A process according to claim 1 wherein constituents ($a$), ($b$) and ($c$) are present in amounts from 5% to 99.9%, 0.1% to 30.0% and up to 94.9% by weight, respectively.

11. A photopolymerizable element comprising a sheet support bearing on at least one surface a photopolymerizable layer comprising:

($a$) an essentially colorless addition polymerizable monomer of the formula $CH_2{=}CR{-}CO{-}Z{-}Y$ wherein R is a member selected from the group consisting of H and methyl, Z is a member selected from the group consisting of —NH— and —O— and Y is a member selected from the group consisting of aromatic nuclei and heterocyclic nuclei containing uncharged hetero atoms containing as an active dye-forming nucleus a structure of the formula:

$$X-(\overset{|}{C}=\overset{|}{C})_n-\overset{|}{C}=\overset{|}{C}H$$

where X is a member selected from the group consisting of OHC—, HO—, R'HN— wherein R' is alkyl of 1–4 carbon atoms and $H_2N$—, and $n$ is one of the cardinal numbers 0 and 1, said nucleus being capable of forming a dye selected from the group consisting of quinoneimine and azomethine dyes, and ($b$) an addition polymerization initiator activatable by actinic light, constituents ($a$) and ($b$) being present in amounts from 5% to 99.9% and 0.1% to 30.0% by weight, respecitvely.

12. A photopolymerizable element according to claim 11 containing an addition polymerizable, ethylenically unsaturated monomer having at least one terminal ethylenic group, a normal boiling point above 100° C., a molecular weight up to 15,000, being capable of forming a high polymer by photoinitiated polymerization and free from dye-forming nuclei in an amount up to 10 moles per mole of the dye-forming monomer.

13. A photopolymerizable element according to claim 11 containing, in addition:

($c$) an organic polymeric binder for constituents ($a$) and ($b$) in an amount up to 94.9% by weight.

14. An element according to claim 11 wherein said monomer is an amide of an aromatic aminoaldehyde with methacrylic acid.

15. An element according to claim 11 wherein said support is a sheet of paper.

16. An element according to claim 11 wherein said support is a hydrophobic polymeric film.

References Cited in the file of this patent

UNITED STATES PATENTS

| | | |
|---|---|---|
| 2,469,682 | Dickey | May 10, 1949 |
| 2,489,655 | Martin | Nov. 29, 1949 |
| 2,500,025 | Dickey et al. | Mar. 7, 1950 |
| 2,518,704 | Martin | Aug. 15, 1950 |
| 2,649,438 | Bruson | Aug. 18, 1953 |
| 2,656,339 | Padbury | Oct. 20, 1953 |
| 2,722,512 | Crandall | Nov. 1, 1955 |
| 2,760,863 | Plambeck | Aug. 28, 1956 |
| 2,902,365 | Martin | Sept. 1, 1959 |
| 2,934,525 | Fekete | Apr. 26, 1960 |
| 2,949,361 | Agnes | Aug. 16, 1960 |
| 2,976,294 | Firestine | Mar. 21, 1961 |

FOREIGN PATENTS

| | | |
|---|---|---|
| 61,825 | Germany | Oct. 15, 1948 |
| 786,119 | Great Britain | Nov. 13, 1957 |

OTHER REFERENCES

Neblette: Photography—Its Materials and Processes, 5th edition, Lancaster Press, Lancaster, Pa., 1952, pages 216 and 222–223.